(12) United States Patent
Okada (10) Patent No.: US 12,366,559 B2
(45) Date of Patent: Jul. 22, 2025

(54) GAS CHROMATOGRAPH DEVICE

(71) Applicant: Shimadzu Corporation, Kyoto (JP)

(72) Inventor: Masayuki Okada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 272 days.

(21) Appl. No.: 17/965,694

(22) Filed: Oct. 13, 2022

(65) Prior Publication Data

US 2023/0184724 A1 Jun. 15, 2023

(30) Foreign Application Priority Data

Dec. 14, 2021 (JP) .................. 2021-202278

(51) Int. Cl.
*G01N 30/54* (2006.01)
*G01N 30/30* (2006.01)

(52) U.S. Cl.
CPC ............. *G01N 30/54* (2013.01); *G01N 30/30* (2013.01); *G01N 2030/3084* (2013.01)

(58) Field of Classification Search
CPC . G01N 30/54; G01N 30/30; G01N 2030/3084
USPC ........................................ 73/23.39
See application file for complete search history.

(56) References Cited

U.S. PATENT DOCUMENTS 8,529,672 B2 * 9/2013 Botelho ................ G01N 30/30
73/23.35

FOREIGN PATENT DOCUMENTS

| JP | H0783896 A | | 3/1995 |
|---|---|---|---|
| JP | H0886781 A | * | 4/1996 |
| JP | H08101183 A | | 4/1996 |
| JP | 2010249730 A | * | 11/2010 |
| JP | 2014002049 A | | 1/2014 |
| JP | 3200787 U | | 11/2015 |

OTHER PUBLICATIONS

Morii with Translation (Year: 2010).*
Iida et al. with Translation (Year: 1996).*

* cited by examiner

*Primary Examiner* — Peter J Macchiarolo
*Assistant Examiner* — Rodney T Frank
(74) *Attorney, Agent, or Firm* — Muir Patent Law, PLLC (57) ABSTRACT

A gas chromatograph device is provided with a column oven, an opening-and-closing mechanism, a cooling fan, a control chamber, and a switching mechanism. The column oven includes an air intake port and an air outlet port. The opening-and-closing mechanism opens and closes the air intake port and the air outlet port. The control chamber is provided outside the column oven. The control chamber is communicated with the inside of the column oven via the air intake port in a state in which the air intake portion is opened by the opening-and-closing mechanism. The control chamber is provided inside thereof with the controller. The switching mechanism switches a wind direction of the cooling fan in a state in which the air intake portion is opened by the opening-and-closing mechanism to direct at least a part of wind from the cooling fan to the air intake port.

6 Claims, 10 Drawing Sheets

GAS CHROMATOGRAPH DEVICE

CROSS-REFERENCE TO RELATED APPLICATIONS

This application claims priority under 35 U.S.C. § 119 to Japanese Patent Application No. JP2021-202278 filed on Dec. 14, 2021, the entire disclosure of which is incorporated herein by reference in its entirety.

BACKGROUND OF THE INVENTION

Field of the Invention

The present invention relates to a gas chromatograph device.

Description of Related Art

For example, a column oven is provided in a housing of a gas chromatograph device as disclosed in Patent Document 1 listed below. In the housing, for example, a control board, etc., are provided outside the column oven.

PRIOR ART DOCUMENT

Patent Document

Patent Document 1: Japanese Unexamined Patent Application Publication No. 2014-002049

SUMMARY OF THE INVENTION

Problems to be Solved by the Invention

A stirring fan for stirring the air in a column oven is provided in the column oven of a gas chromatograph device. According to the stirring fan, at the timing when the air intake port of the column oven is in an opened state, the air taken in from the air intake port deprives the heat in the column oven, and the air is discharged from the air outlet port of the column oven. That is, the inside of the column oven is cooled.

Further, various boards, a power supply, etc., are arranged in the control chamber adjoining the column oven, and they are cooled by a cooling fan provided separately from the stirring fan.

In other words, in the gas chromatograph device, the board, etc., arranged in the control chamber and the inside of the column oven are independently cooled.

Further, in such a gas chromatograph device, in some cases, an air supply fan for supplying air to an air intake port of the column oven is provided. In such a case, by using both the air supply fan and the stirring fan in combination, it is possible to quickly cool the inside of the column oven.

On the other hand, in the case of providing an air supply fan separately, the number of components increases, resulting in an unnecessarily increased cost.

The present invention has been made in view of the above-described circumstances. One object of the present invention is to provide a gas chromatograph device capable of directing at least a part of wind from a cooling fan to an air intake port of a column oven.

Means for Solving the Problem

According to one aspect of the present invention, the gas chromatograph device is provided with a column oven, a stirring fan, an opening-and-closing mechanism, a controller, a cooling fan, a control chamber, and a switching mechanism. The column oven is provided with an air intake port and an air outlet port. The stirring fan stirs the air in the column oven. The opening-and-closing mechanism opens and closes the air intake port and the air outlet port. The cooling fan cools the controller. The control chamber is provided outside the column oven and is communicated with an inside of the column oven via the air intake port in a state in which the air intake portion is opened by the opening-and-closing mechanism. The control chamber is provided therein with the controller. The switching mechanism switches a wind direction of the cooling fan in the state in which the air intake portion is opened by the opening-and-closing mechanism to direct at least a part of wind from the cooling fan to the air intake port.

Effects of the Invention

According to the present invention, it is possible to direct at least a part of the wind from the cooling fan to the air intake port of the column oven by switching the wind direction of the cooling fan.

BRIEF DESCRIPTION OF THE DRAWINGS

Some preferred embodiments of the present invention are shown by way of example, and not limitation, in the accompanying figures.

EMBODIMENTS FOR CARRYING OUT THE INVENTION

1. Configuration of Gas Chromatograph Device

FIG. 1 to FIG. 4 are schematic cross-sectional views showing one example of a gas chromatograph device 10 according to one embodiment of the present invention. FIG.

Figure 3:
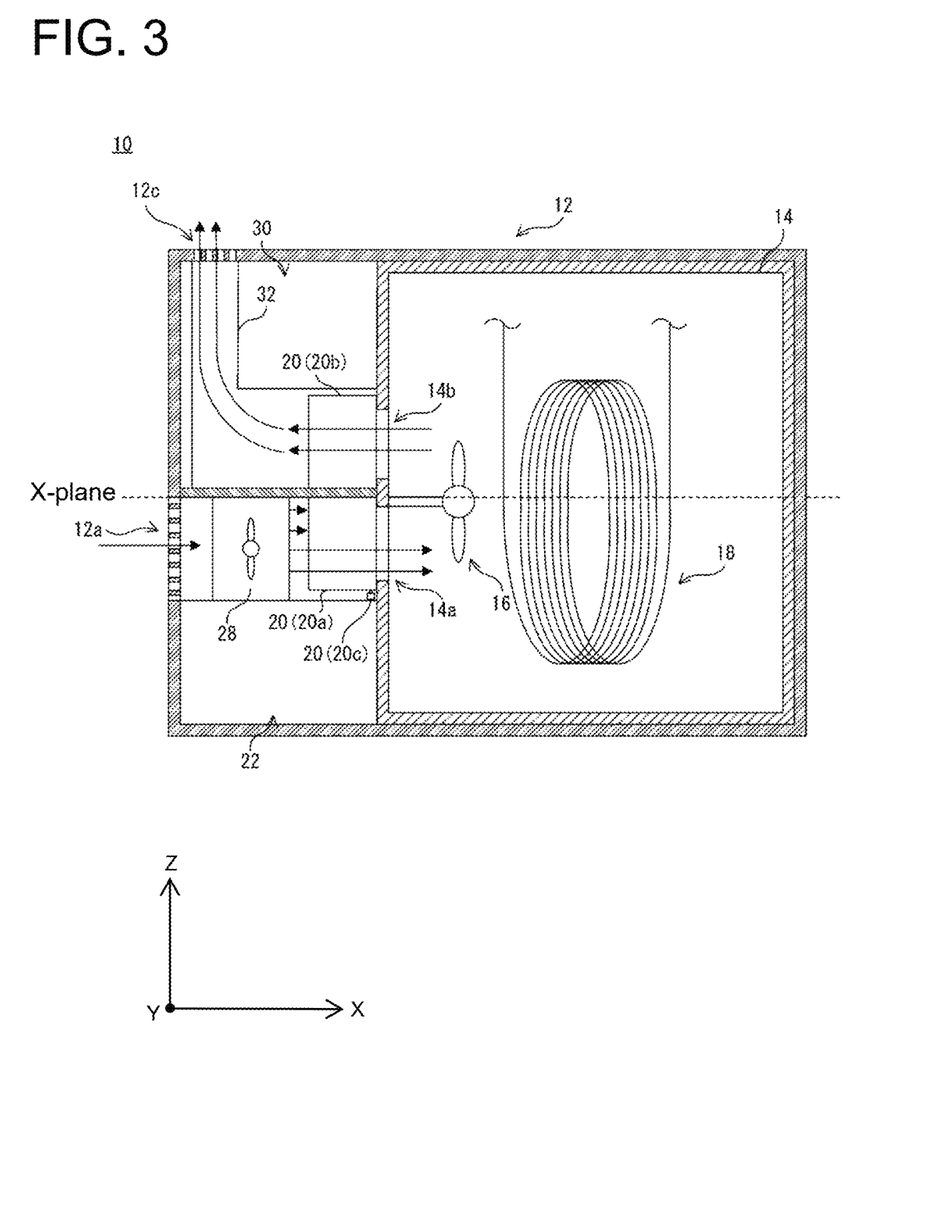
FIG. 3 is a schematic cross-sectional view showing one example of the configuration of the gas chromatograph device according to the embodiment.
Figure 4:
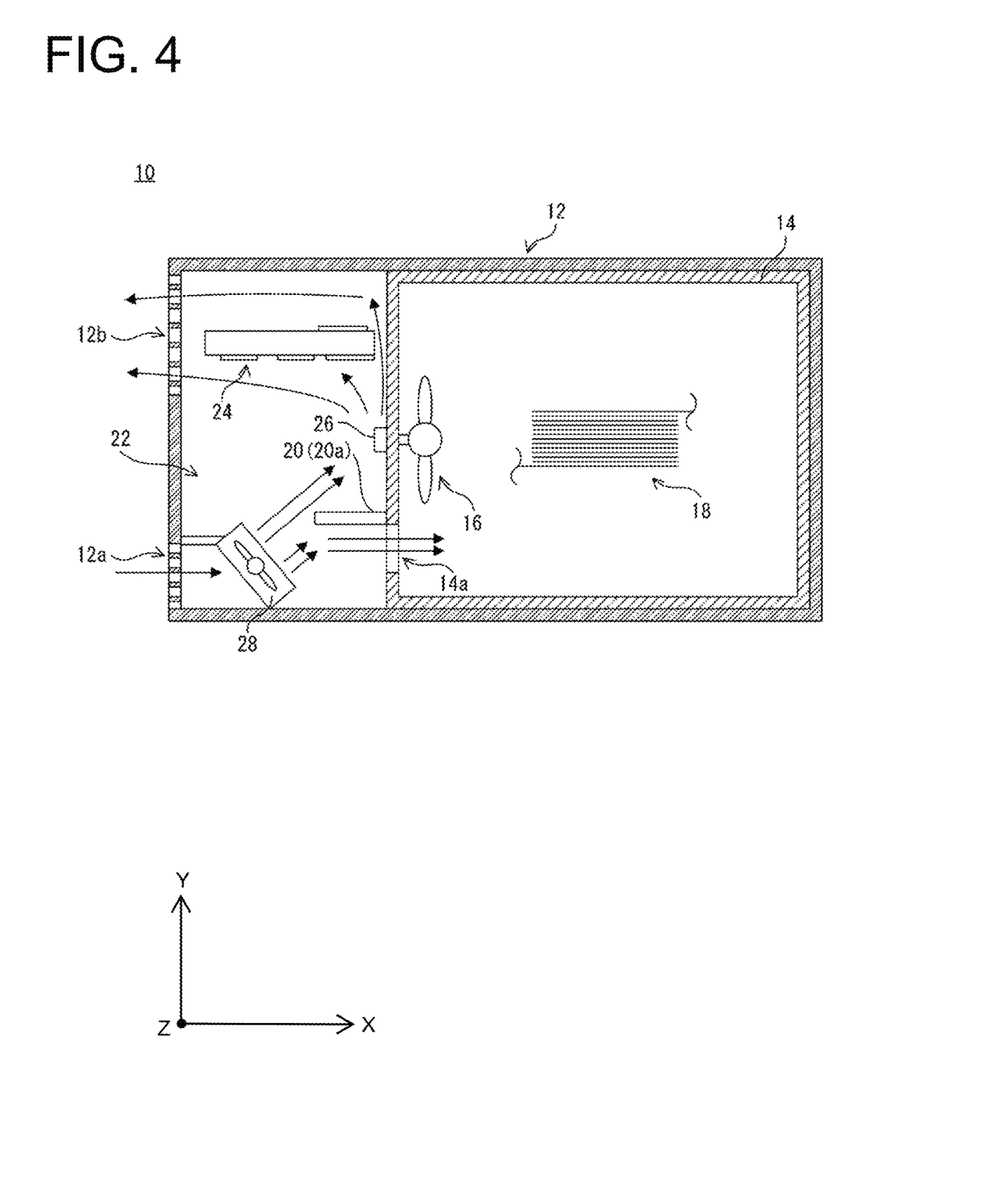
FIG. 4 is a schematic cross-sectional view showing one example of the configuration of the gas chromatograph device according to the embodiment.

1 specifically shows the gas chromatograph device 10 in a state in which an air intake port 14a and an air outlet port 14b are closed, which will be described later. FIG. 2 is a schematic cross-sectional view of the gas chromatograph device 10 shown in FIG. 1 taken along the X-plane in FIG. 1. FIG. 3 specifically shows the gas chromatograph device 10 in a state in which the air intake port 14a and the air outlet port 14b are opened. FIG. 4 is a schematic cross-sectional view of the gas chromatograph device 10 shown in FIG. 3 taken along the X-plane in FIG. 3. Hereinafter, the gas chromatograph device 10 will be described with reference to FIGS. 1 to 4.

A column oven 14 is provided in a housing 12 of the gas chromatograph device 10. The column oven 14 is provided with an air intake port 14a and an air outlet port 14b. Also provided in the column oven 14 is a stirring fan 16 for stirring the air in the column oven 14. Further, a column 18 is provided in the column oven 14.

Further, the gas chromatograph device 10 is provided with an opening-and-closing mechanism 20 for opening and closing the air intake port 14a and the air outlet port 14b of the column oven 14. The opening-and-closing mechanism 20 is provided with an opening-and-closing door 20a for opening and closing the air intake port 14a and an opening-and-closing door 20b for opening and closing the air outlet port 14b. The opening-and-closing mechanism 20 is provided with a driving unit 20c for operating the opening-and-closing door 20a and the opening-and-closing door 20b. Note that the driving unit 20c is a general-purpose motor.

In the example shown in FIGS. 1 to 4, the driving force of the driving unit 20c is transmitted to the opening-and-closing door 20a and the opening-and-closing door 20b via a shaft-like member, and therefore, the opening-and-closing door 20a and the opening-and-closing door 20b rotate about the shaft-like member.

Further, in this embodiment, in addition to the column oven 14, a control chamber 22 is provided in the housing 12. The control chamber 22 is communicated with the inside of the column oven 14 via the air intake port 14a in a state in which the air intake port 14a is opened by the opening-and-closing mechanism 20. A controller 24, etc., is arranged in the control chamber 22.

The controller 24 denotes a substrate, a power supply, etc., for controlling the gas chromatograph device 10. Specifically, the controller 24 includes a control board, a switching power supply, and the like for controlling the temperature in the column oven 14. However, a substrate for performing a part of the control of the gas chromatograph device 10, such as, e.g., an operation substrate for processing a signal based on an operation of an operation unit (not shown) and a display substrate for controlling a display unit (not shown), is not included in the controller 24 and may be provided at a position other than the control chamber 22. In addition to the controller 24, a driving unit 26 for driving the stirring fan 16 is arranged in the control chamber 22. Note that the driving unit 26 is a general-purpose motor.

The housing 12 is provided with an air intake port 12a for taking air into the control chamber 22. The housing 12 is further provided with an air outlet port 12b for discharging the air in the control chamber 22. The air intake port 12a and the air outlet port 12b are always open.

Further, the gas chromatograph device 10 of this embodiment is provided with a cooling fan 28 for cooling the controller 24, etc. The cooling fan 28 overlaps with the air intake port 14a of the column oven 14 in the air intake direction of the air intake port 14a. That is, the cooling fan 28 is located on the extension of the center line of the air intake port 14a. The cooling fan 28 is inclined at an angle of 30° to 60°, more specifically at an angle of about 45°, with respect to the centerline of the air intake port 14a. Note that the linear direction connecting the controller 24 and the cooling fan 28 is inclined with respect to the linear direction connecting the cooling fan 28 and the air intake port 14a.

The cooling fan 28 shown in FIGS. 1 to 4 is provided in the control chamber 22 and faces in the direction inclined with respect to the air intake direction of the air intake port 14a, specifically faces toward the controller 24. Further, in the example shown in FIGS. 1 to 4, the cooling fan 28 is provided in the housing 12 and also overlaps with the air intake port 12a in the air intake direction of the air intake port 12a of the housing 12. That is, the cooling fan 28 is positioned on the extension of the center line of the air intake port 12a. It can also be said that the cooling fan 28 is positioned on the straight line connecting the air intake port 12a and the air intake port 14a.

Further, in this embodiment, a discharge chamber 30 is provided outside the column oven 14 in the housing 12 separately from the control chamber 22. The housing 12 is provided with an air outlet port 12c for discharging the air in the discharge chamber 30, and the air outlet port 12c is always open.

A duct 32 is provided in the discharge chamber 30. The duct 32 causes the inside of the column oven 14 to communicate with the outside of housing 12. The air discharged from the air outlet port 14b is discharged to the outside of the housing 12 via the duct 32.

Figure 1:
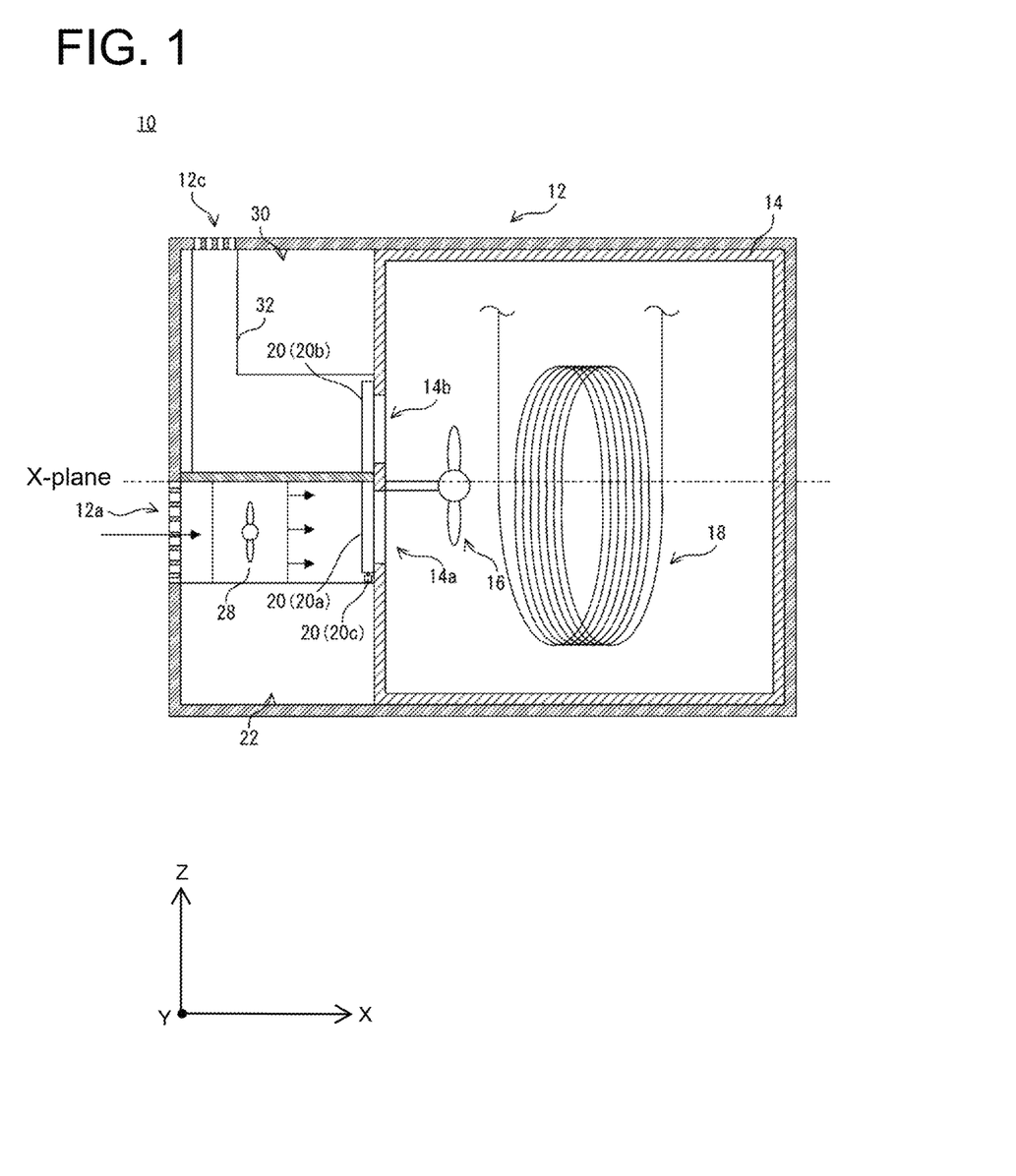
FIG. 1 is a schematic cross-sectional view showing one example of a configuration of a gas chromatograph device according to an embodiment.
Figure 2:
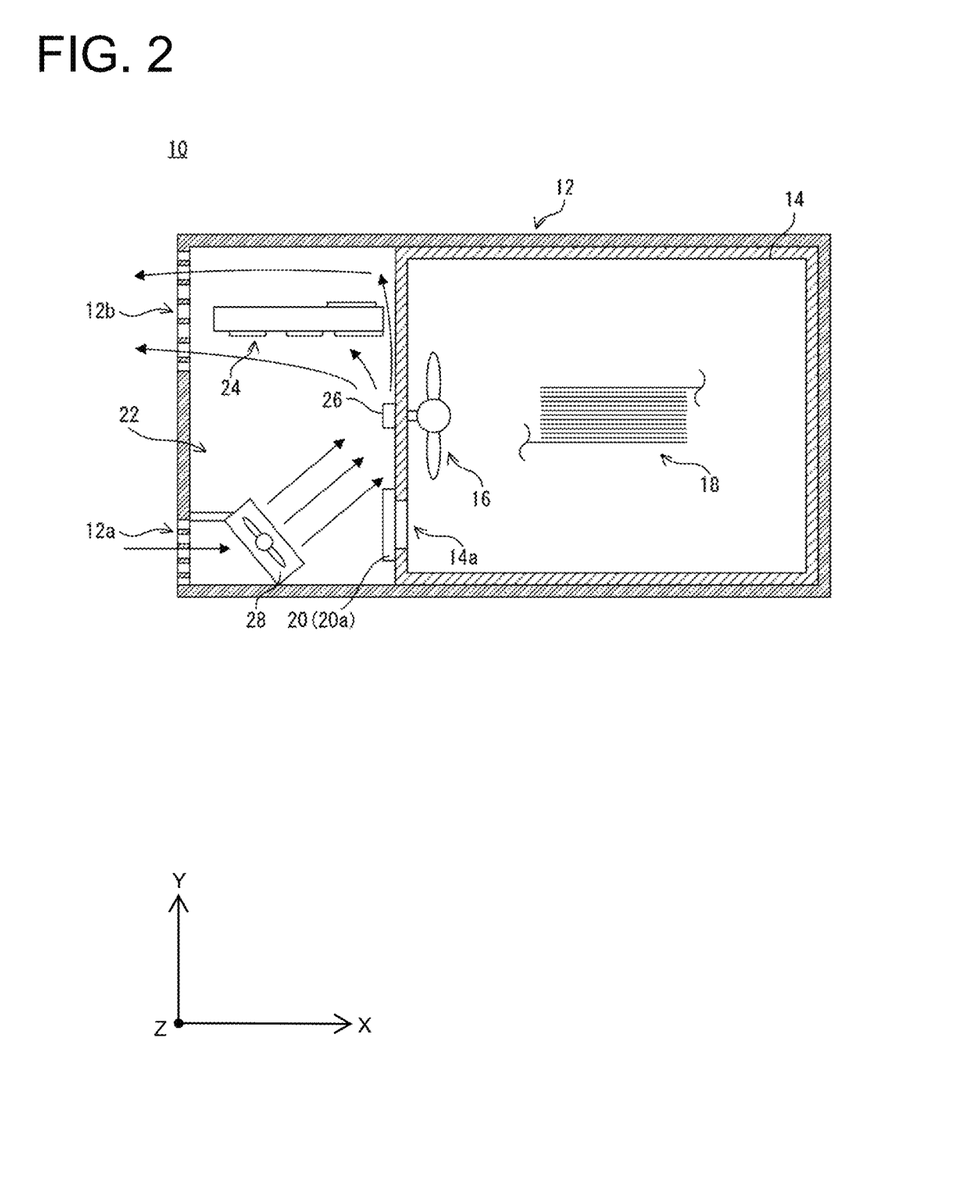
FIG. 2 is a schematic cross-sectional view showing one example of the configuration of the gas chromatograph device according to the embodiment.

As shown in FIGS. 1 and 2, in a state in which both the air intake port 14a and the air outlet port 14b are closed by the opening-and-closing mechanism 20, when the stirring fan 16 is driven, the deviation of the temperature in the column oven 14 is improved.

Further, as shown in FIGS. 1 and 2, in a state in which the air intake port 14a and the air outlet port 14b are closed by the opening-and-closing mechanism 20, when the cooling fan 28 is driven, the controller 24, etc., are exposed to the wind from the cooling fan 28.

The air deprived the heat from the controller 24, etc., is discharged to the outside the housing 12 via the air outlet port 12b. Accordingly, in a case where the air intake port 14a and the air outlet port 14b are closed, the controller 24, etc., are cooled when the cooling fan 28 is driven.

On the other hand, as shown in FIGS. 3 and 4, in a state in which the air intake port 14a and the air outlet port 14b are opened by the opening-and-closing mechanism 20, when the stirring fan 16 is driven, the air taken in from the air intake port 14a is stirred in the column oven 14 to deprive the heat in the column oven 14.

The air deprived the heat in the column oven 14 is discharged to the outside of the housing 12 via the air outlet port 14b, etc. Therefore, in a state in which the air intake port 14a and the air outlet port 14b are open, when the stirring fan 16 is driven, the inside of the column oven 14 is cooled.

Further, as shown in FIGS. 3 and 4, in a state in which the air intake port 14a and the air outlet port 14b are opened by the opening-and-closing mechanism 20, when the cooling fan 28 is driven, the opening-and-closing door 20a blocks at least a part of the wind from the cooling fan 28. The wind blocked by the opening-and-closing door 20a is directed to the air intake port 14a.

The opening-and-closing door 20a is rotated to the position not overlapping with the air intake port 14a in the air intake direction of the air intake port 14a in the state in which the air intake port 14a is open. That is, the opening-and-closing door 20a opens the air intake port 14a in a state of being rotated by 90° or more from the state in which the air intake port 14a is closed. In the state in which the air intake port 14a is open, a part of the opening-and-closing door 20a faces in the wind direction of the cooling fan 28. Therefore, at least a part of the wind from the cooling fan 28 is blocked, and the at least a part of the wind direction of the wind is converted toward the air intake port 14a.

That is, the opening-and-closing door 20a directs at least a part of the wind from the cooling fan 28 to the air intake port 14a by blocking the at least a part of the wind from in a state in which the air intake port 14a and the air outlet port 14b are opened by the opening-and-closing mechanism 20.

Further, from the above, as shown in FIGS. 3 and 4, by driving the stirring fan 16 while directing the wind from the cooling fan 28 to the air intake port 14a, as compared with the case of driving the stirring fan 16 without directing the wind from the cooling fan 28 to the air intake port 14a, it is possible to cool the column oven 14 efficiently.

For example, in a case of directing only the part of the wind from the cooling fan 28 to the air intake port 14a by the opening-and-closing door 20, the inside of the column oven 14 can be cooled efficiently while cooling the controller 24, etc., by the remaining wind from the cooling fan 28.

On the other hand, in the case of directing all of the wind from the cooling fan 28 to the air intake port 14a by the opening-and-closing door 20a, the inside of the column oven 14 can be cooled more efficiently as compared with the case of directing a part of the wind from the cooling fan 28 to the air intake port 14a.

Further, in this embodiment, a switching mechanism 34 (see FIGS. 5 to 7), which will be described later, may be provided. The switching mechanism 34 directs at least a part of the wind from the cooling fan 28 to the air intake port 14a by switching the wind direction of the cooling fan 28 in a state in which the air intake port 14a is opened by the opening-and-closing mechanism 20.

Further, the switching mechanism 34 may include a rectifying member 36 (see FIGS. 6 to 7), which will be described later. The rectifying member 36 is displaceable and directs at least a part of the wind from the cooling fan 28 to the air intake port 14a in a state in which the air intake port 14a is opened by the opening-and-closing mechanism 20. Note that the displacement of the rectifying member 36 includes the movement or the rotation of the rectifying member 36.

As shown in FIGS. 1 to 4, in the case of directing a part of the wind from the cooling fan 28 to the air intake port 14a by the opening-and-closing door 20a of the opening-and-closing mechanism 20, the opening-and-closing mechanism 20 serves as the switching mechanism 34, and the opening-and-closing door 20a serves as the rectifying member 36. In other words, in this case, the opening-and-closing mechanism 20 may be referred to as the switching mechanism 34. Further, the opening-and-closing door 20a may be referred to as the rectifying member 36.

Further, in this embodiment, in a case in which the switching mechanism 34 is provided separately from the opening-and-closing mechanism 20, the opening-and-closing door 20a and the opening-and-closing door 20b may be provided, for example, in a slidable manner.

In this embodiment, in a case where the rectifying member 36 is not included in the switching mechanism 34, the switching mechanism 34 may displace the cooling fan 28. The displacement of the cooling fan 28 includes the movement or the rotation of the cooling fan 28 itself.

Figure 5:
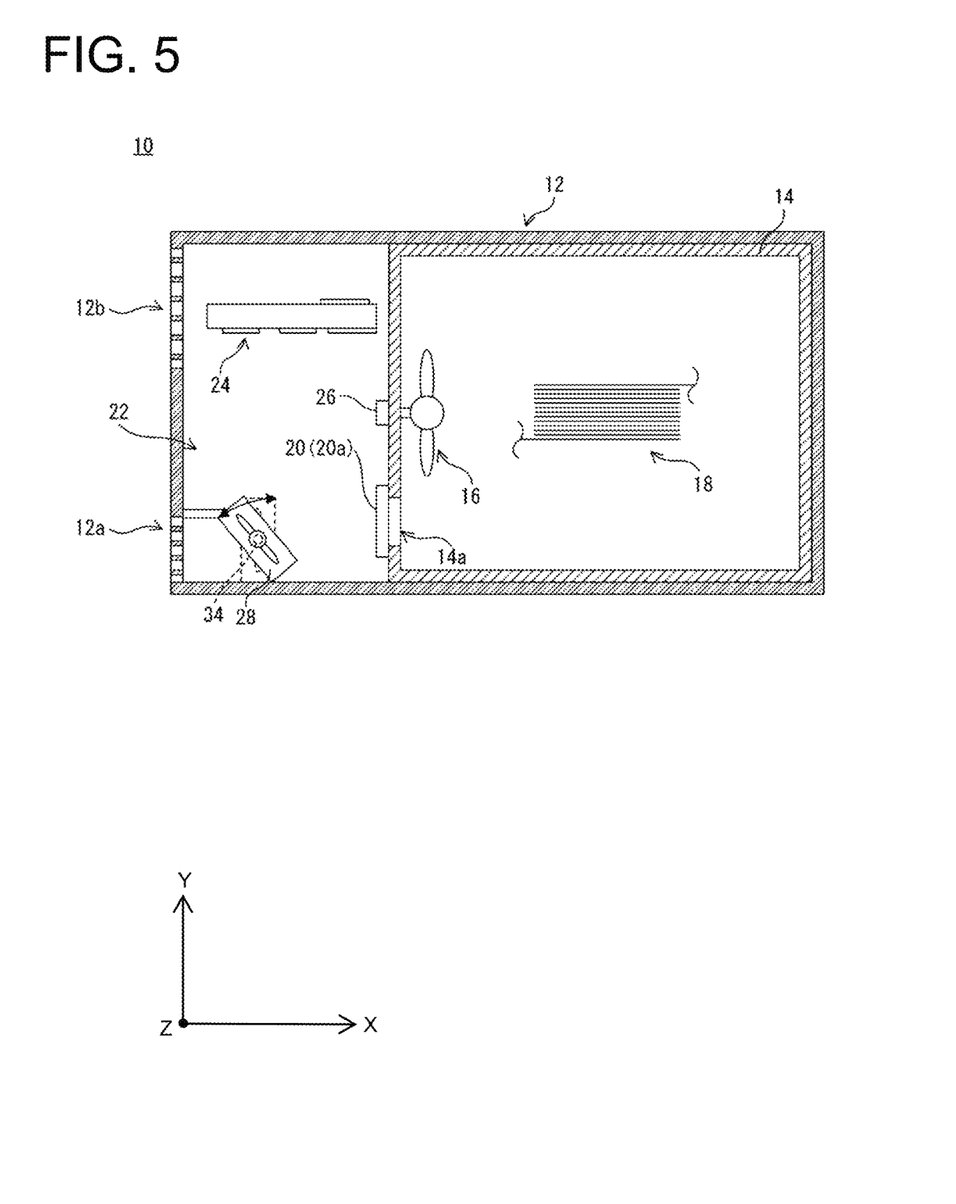
FIG. 5 is a schematic cross-sectional view showing a modification of a configuration of a switching mechanism according to the embodiment.

FIG. 5 is a schematic cross-sectional view showing a modification of the configuration of the switching mechanism 34 according to this embodiment. In the example shown in FIG. 5, the switching mechanism 34 rotates the cooling fan 28. Note that in FIG. 5, the switching mechanism 34 is hidden by the cooling fan 28, and therefore, it is represented by the broken line.

In a state in which the air intake port 14a closed by the opening-and-closing mechanism 20, as shown in FIG. 5, the cooling fan 28 faces the direction in which the controller 24 is positioned. In this case, the controller 24, etc., are cooled by the air from the cooling fan 28.

In a state in which the air intake port 14a is opened by the opening-and-closing mechanism 20, the cooling fan 28 faces the air intake port 14a side. That is, in a state in which the air intake port 14a is opened by the opening-and-closing mechanism 20, the cooling fan 28 is directed toward the air intake port 14a to direct more wind to the air intake port 14a than in a case in which the air intake port 14a is closed by the opening-and-closing mechanism 20.

As described above, in the case of switching the wind direction of the cooling fan 28 by changing only the direction of the cooling fan 28 itself, the amount of air to be directed to the air intake port 14a can be adjusted simply by adjusting the direction of the cooling fan 28 itself.

Alternatively, the switching of the wind direction of the cooling fan 28 may be performed by moving the cooling fan 28 itself. In the case of moving the cooling fan 28 itself, the position of the air supply destination may be changed by moving the cooling fan 28 itself to adjust the amount of the air to be directed to the air intake port 14a. Note that the movement and the rotation of the cooling fan 28 itself may be performed in a combined manner.

Figure 6:
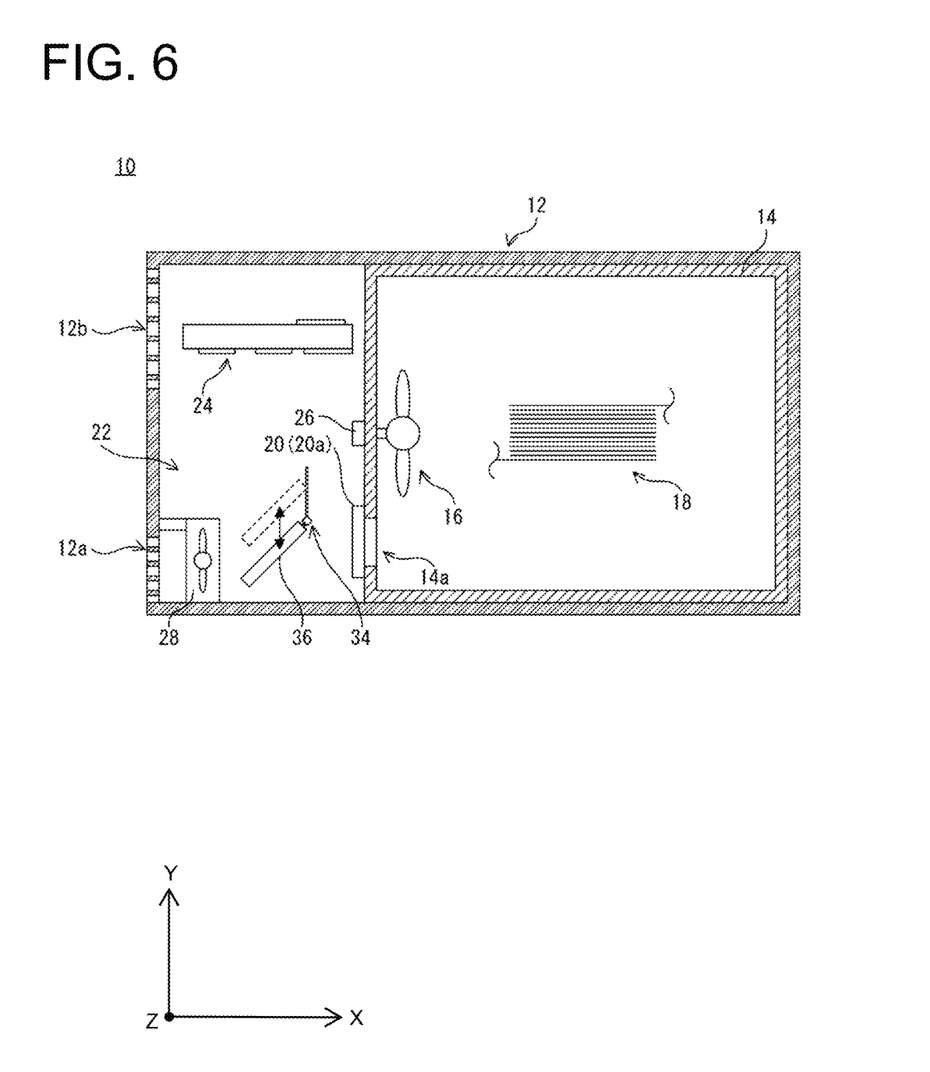
FIG. 6 is a schematic cross-sectional view showing another modification of the configuration of the switching mechanism according to the embodiment.

FIG. 6 is a schematic cross-sectional view showing another modification of the configuration of the switching mechanism 34 according to this embodiment. The switching mechanism 34 includes a rectifying member 36. Further, in the example shown in FIG. 6, the cooling fan 28 faces the direction in which the air intake port 14a is positioned.

In the example shown in FIG. 6, the switching mechanism 34 includes, in addition to the rectifying member 36, a configuration that allows the movement of the rectifying member 36. For example, the switching mechanism 34 includes a guide in addition to the rectifying member 36. The guide is positioned between the cooling fan 28 and the air intake port 14a and extends across, specifically substantially perpendicular to, the wind direction of the cooling fan 28.

Further, the switching mechanism 34 is movable along the guide and includes a displacing member coupled to the rectifying member 36. That is, the rectifying member 36 is movable along the guide as appropriate. The rectifying member 36 is inclined with respect to the air intake direction of the air intake port 14a.

In a state in which the air intake port 14a is closed by the opening-and-closing mechanism 20, the rectifying member 36 blocks at least a part of the wind from the cooling fan 28. In this case, at least a part of the wind from the cooling fan 28 is directed to the controller 24, etc. In a state in which the air intake port 14a is closed by the opening-and-closing mechanism 20, it is preferable that all of the wind from the cooling fan 28 be blocked by the rectifying member 36 to direct all of the wind to the controller 24, etc.

It may be configured such that in a state in which the air intake port 14a is opened by the opening-and-closing mechanism 20, the rectifying member 36 blocks or does not block a part of the wind from the cooling fan 28.

As described above, in the case of switching the wind direction of the cooling fan 28 by simply moving the rectifying member 36, the amount of the air to be directed to the controller 24, etc., can be adjusted according to the position of the rectifying member 36.

Further, in the embodiment illustrated in FIG. 6, the cooling fan 28 faces the direction in which the air intake port 14a is positioned, and therefore, adjusting the amount of the air to be directed to the controller 24, etc., also means adjusting the amount of the air to be directed to the air intake port 14a.

Note that as shown in FIG. 6, as long as the position of the rectifying member 36 with respect to the cooling fan 28 can be switched by moving the rectifying member 36 to direct at least a part of the wind from the cooling fan 28 to the air intake port 14a, the shape and the moving route of the rectifying member 36 are not particularly limited. The same can be applied to the configuration for moving the rectifying member 36.

Further, the wind direction of the cooling fan 28 may be switched by rotating the rectifying member 36. In the case of rotating the rectifying member 36, the rectifying member 36 is positioned between the cooling fan 28 and the air intake port 14a and overlaps with the air intake port 14a in the air intake direction of the air intake port 14a. That is, the rectifying member 36 is arranged at the position indicated by the solid line shown in FIG. 6.

In such a case, the amount of air to be directed to the controller 24, etc., can be adjusted by adjusting the angle of the rectifying member 36 with respect to the wind direction of the cooling fan 28. That is, the amount of air to be directed to the air intake port 14a is also adjusted in the same manner. Note that the movement and the rotation of the rectifying member 36 may be performed in combination.

Figure 7:
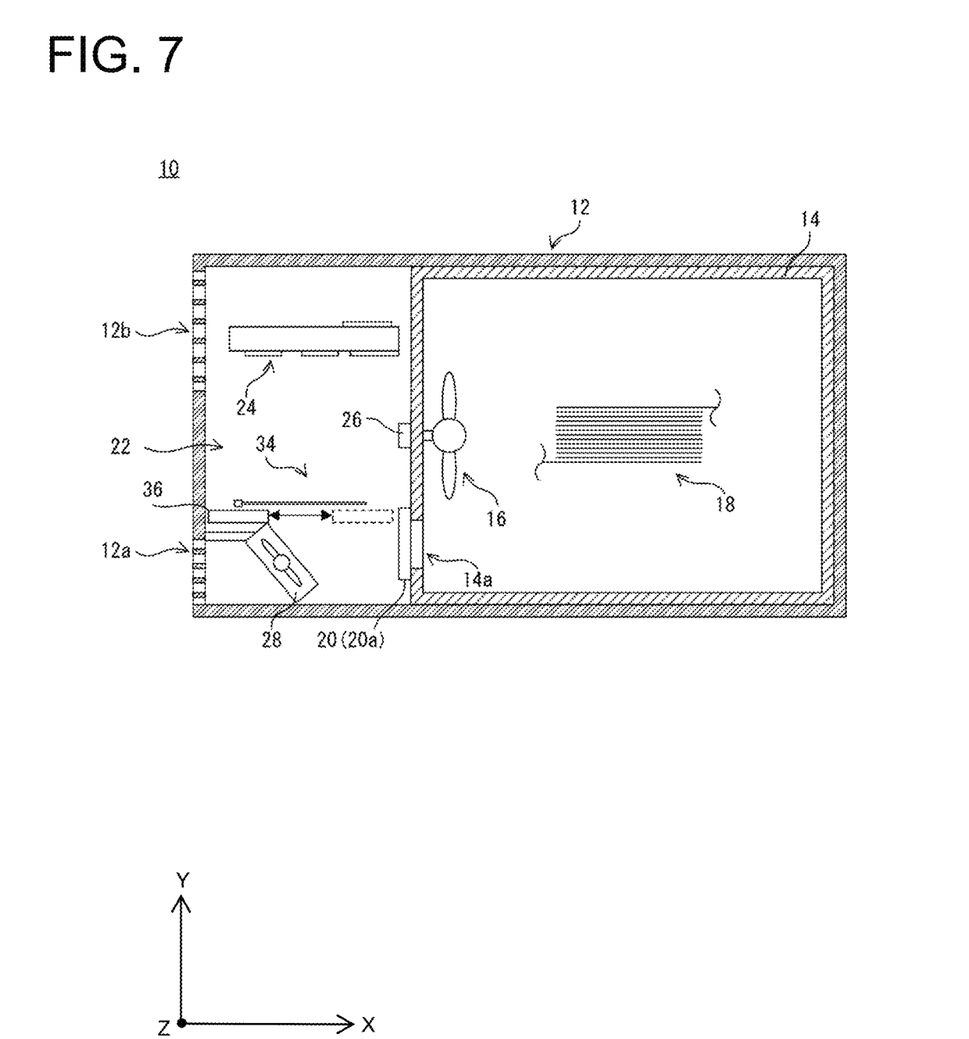
FIG. 7 is a schematic cross-sectional view showing still another modification of the configuration of the switching mechanism according to the embodiment.

FIG. 7 is a schematic cross-sectional view showing still another modification of the configuration of the switching mechanism 34 according to this embodiment. The switching mechanism 34 shown in FIG. 7 includes the configuration that allows the rectifying member 36 to move, similar to the switching mechanism 34 shown in FIG. 6.

Further, in the example shown in FIG. 7, the cooling fan 28 faces the direction inclined with respect to the air intake direction of the air intake port 14a, specifically, faces toward the controller 24.

Further, in the example shown in FIG. 7, the rectifying member 36 extends along the air intake direction of the air intake port 14a and is movable along the air intake direction.

In the example shown in FIG. 7, unlike the example shown in FIG. 6, the rectifying member 36 blocks the wind of the cooling fan 28 to direct the wind to the air intake port 14a.

In a state in which the air intake port 14a is closed by the opening-and-closing mechanism 20, the rectifying member 36 does not interfere with the wind from the cooling fan 28. That is, all of the wind from the cooling fan 28 is directed to the controller 24, etc.

In a state in which the air intake port 14a is opened by the opening-and-closing mechanism 20, the rectifying member 36 blocks at least a part of the wind from the cooling fan 28 to direct the at least a part of the wind to the air intake port 14a. Note that the amount of the air to be directed to the air intake port 14a varies depending on the position of the rectifying member 36.

Further, as described above, as long as the position of the rectifying member 36 with respect to the cooling fan 28 can be switched by moving the rectifying member 36 to direct at least a part of the wind from the cooling fan 28 to the air intake port 14a, the shape, the moving route, etc., of the rectifying member 36 are not particularly limited. The same can be applied to the configuration for moving the rectifying member 36.

Further, as described above, the switching of the wind direction of the cooling fan 28 may be performed by rotating the rectifying member 36. In the case of rotating the rectifying member 36, the rectifying member 36 is arranged at the position of the wind direction of the cooling fan 28. That is, the rectifying member 36 is arranged at the position indicated by the broken line in FIG. 7.

In such a case, by adjusting the angle of the rectifying member 36 with respect to the wind direction of the cooling fan 28, the amount of the air to be directed to the air intake port 14a is similarly adjusted. Note that the movement and the rotation of the rectifying member 36 may be performed in combination.

Further, for the switching mechanism 34, the configurations as shown in FIGS. 4 to 7 may be appropriately combined.

2. Electrical Configuration of Gas Chromatograph Device

Figure 8:
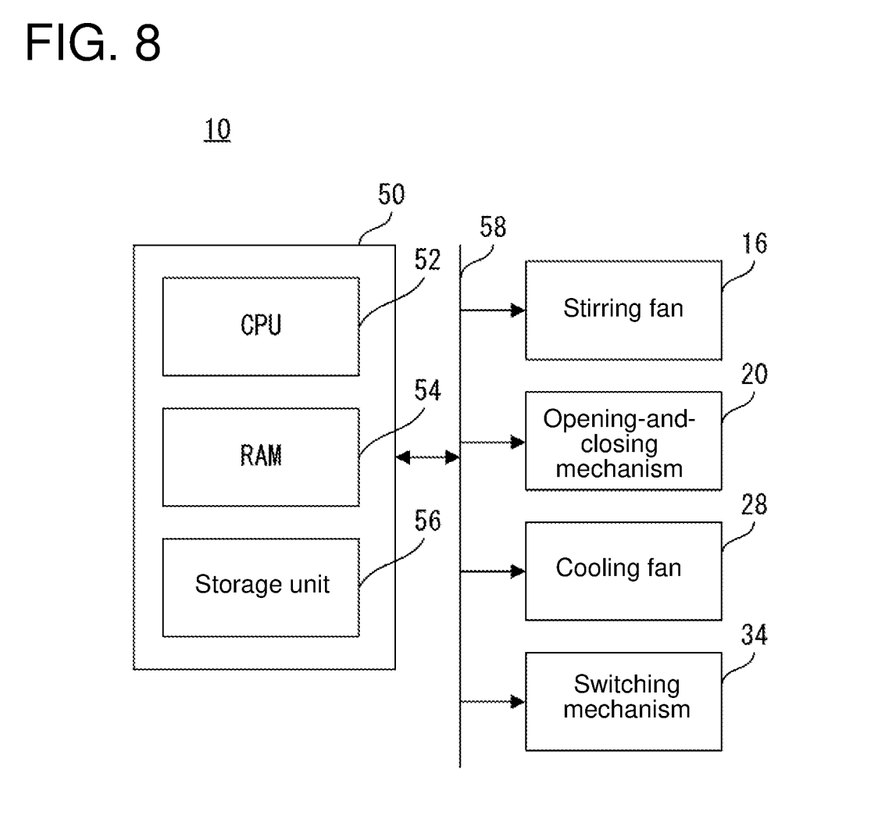
FIG. 8 is a block diagram showing one example of an electric configuration of the gas chromatograph device according to the embodiment.

FIG. 8 is a block diagram showing one example of an electric configuration of the gas chromatograph device 10 according to this embodiment. The controller 24 of the gas chromatograph device 10 includes a main controller 50. The main controller 50, the stirring fan 16, the opening-and-closing mechanism 20, the cooling fan 28, the switching mechanism 34, etc., are electrically connected to each other via a wire 58, such as, e.g., a bus.

The main controller 50 performs the overall control of the gas chromatograph device 10. The main controller 50 is provided with a CPU (Central Processing Unit) 52. The main controller 50 is provided with a RAM (Random Access Memory) 54 and a storage unit 56 to which the CPU 52 can directly access.

The CPU 52 controls each component of the gas chromatograph device 10. The RAM 54 is used as a work area and a buffer area of the CPU 52. The storage unit 56 is a nonvolatile memory, and for example, an HDD (Hard Disc Drive), an SSD (Solid State Drive), or the like is used as the storage unit 56.

The storage unit 56 stores a control program for controlling each component of the gas chromatograph device 10, data required for executing the control program (execution data), and the like. Note that the storage unit 56 may be configured to include the RAM 54.

In such a gas chromatograph device 10, for example, by controlling the cooling fan 28 with the main controller 50, the controller 24, etc., are cooled until the cooling the inside of the column oven 14 is started. When cooling the inside of the column oven 14, the main controller 50 controls the opening-and-closing mechanism 20 and the switching mechanism 34 to open the air intake port 14a and the air outlet port 14b. This allows the switching mechanism 34 to direct at least a part of the wind from the cooling fan 28 to the air intake port 14a.

Further, in the case of cooling the inside of the column oven 14 by directing at least a part of the wind from the cooling fan 28 to the air intake port 14a, the main controller 50 may control the cooling fan 28 to increase the rotation speed thereof. With this configuration, the inside of the column oven 14 can be cooled more efficiently than in the case of directing at least a part of the air from the cooling fan 28 to the air intake port 14a.

Note that the stirring fan 16 and the cooling fan 28 of this embodiment start driving when the power of the gas chromatograph device 10 is turned on and are kept constantly driven until the power is turned off.

3. Specific Electrical Configuration of Gas Chromatograph Device

Figure 9:
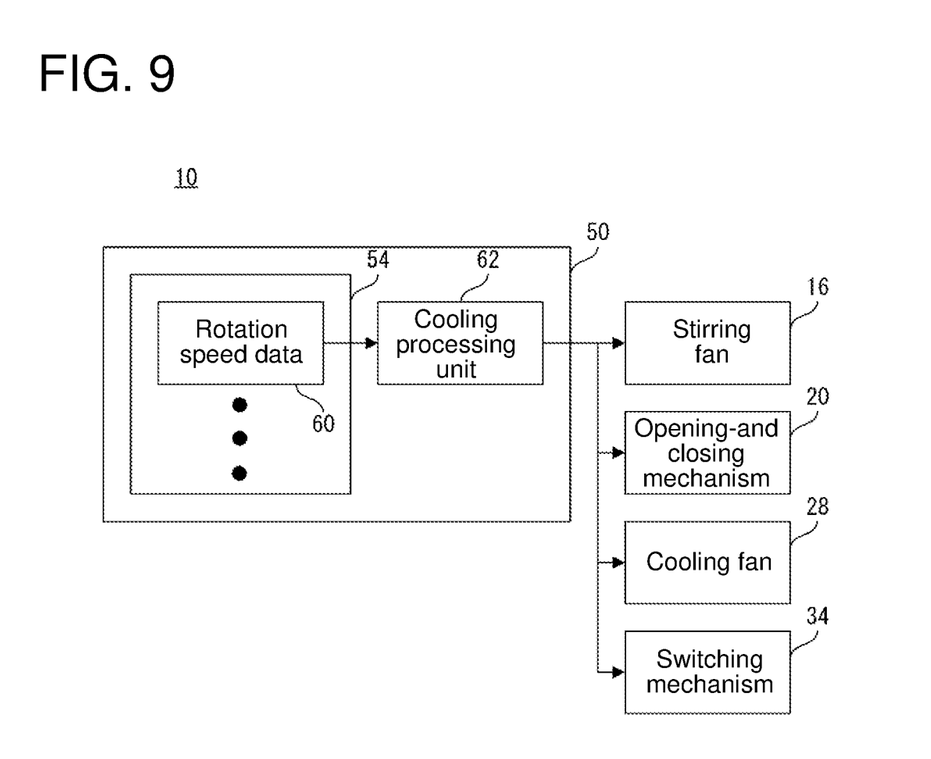
FIG. 9 is a block diagram showing one example of a specific electric configuration of the gas chromatograph device according to the embodiment.

FIG. 9 is a block diagram showing one example of the specific electric configuration of the gas chromatograph device 10 according to this embodiment. In FIG. 9, the illustration of the storage unit 56 is omitted.

The RAM 54 stores executable data read out in advance from the storage unit 56. When the acquired data acquired by using a device, a sensor, or the like is stored in the storage unit 56, the acquired data is temporarily stored in the RAM 54.

In the example shown in FIG. 9, the rotation speed data 60 is stored in the RAM 54. Note that, although not illustrated, the RAM 54 stores data, etc., required for controlling each component. For example, the RAM 54 stores data, etc., indicating the default rotation speed of the cooling fan 28.

The rotation speed data 60 is data indicating the rotation speed of the cooling fan 28. In particular, the rotation speed data 60 indicates a rotation speed higher than the default rotation speed of the cooling fan 28.

The RAM 54 stores a control program (not shown) read out in advance from the storage unit 56, and when the CPU 52 executes the control program, the main controller 50 functions as a cooling processing unit 62.

When cooling the inside of the column oven 14, the cooling processing unit 62 opens the air intake port 14a by the opening-and-closing mechanism 20 and drives the stirring fan 16 while directing at least a part of the wind from the cooling fan 28 to the air intake port 14a by the switching mechanism 34.

Further, when cooling the inside of the column oven 14, the cooling processing unit 62 increases the rotation speed of the cooling fan 28 in accordance with the switching the wind direction of the cooling fan 28 by the switching mechanism 34. Note that the cooling processing unit 62 uses the rotation speed data 60 when increasing the rotation speed of the cooling fan 28.

4. Flow

Figure 10:
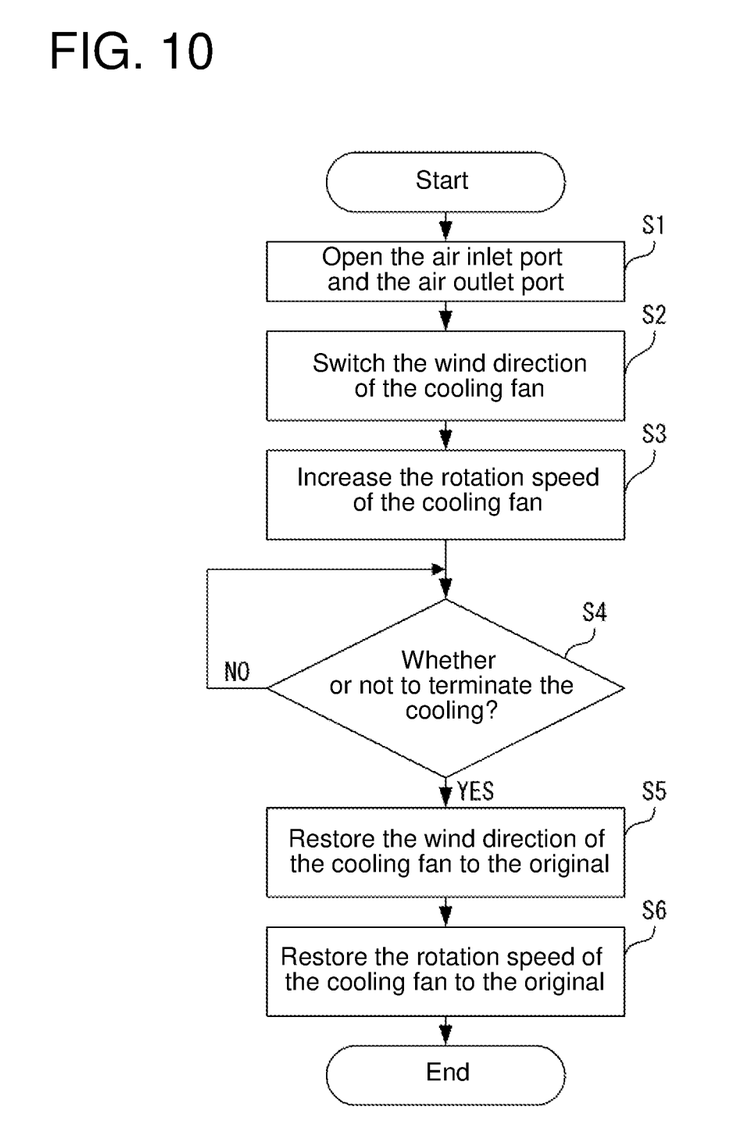
FIG. 10 is a flowchart showing one example of cooling processing of the gas chromatograph device according to the embodiment.

FIG. 10 is a flowchart showing one example of the cooling processing of the CPU 52 according to this embodiment. The cooling processing is initiated, for example, upon completion of the analysis of a sample (e.g., temperature-rising analysis) by the gas chromatograph device 10. The stirring fan 16 and the cooling fan 28 are activated to be driven when the power of the gas chromatograph device 10 is turned on.

In Step S1, the air intake port 14a and the air outlet port 14b are opened, and in Step S2, the wind direction of the cooling fan 28 is switched. In Step S3, the rotation speed of the cooling fan 28 is increased.

In Step S4, it is determined whether or not to terminate the cooling of the inside of the column oven 14. The timing at which the cooling of the inside of the column oven 14 is terminated is optional, and may be, for example, a timing at which a preset time elapses, or a timing at which the temperature in the column oven 14 detected by a temperature sensor (not shown) reaches a predetermined temperature. When "NO" in Step S4, that is, if the cooling of the inside of the column oven 14 is not to be terminated, the process returns to Step S4. On the other hand, when "YES" in Step S4, that is, if the cooling of the inside of the column oven 14 is to be terminated, the process proceeds to Step S5.

In Step S5, the wind direction of the cooling fan 28 is restored, and in Step S6, the rotation speed of the cooling fan 28 is restored to the original. In Step S6, when the rotation speed of the cooling fan 28 is restored to the original, the cooling processing is terminated. It should be noted that the order of the processing to be carried out in each step of the flow diagram shown in the above-described embodiment can be changed appropriately as long as the same results can be obtained.

Further note that the electric configuration, etc., described in the above-described embodiment are merely exemplary and can be appropriately changed in the actual products. For example, the cooling fan 28 may be provided outside the housing 12.

5. Aspect

It will be understood by those skilled in the art that the plurality of exemplary embodiments described above is illustrative of the following aspects.

(Item 1)

A gas chromatograph device according to one aspect of the present invention includes:
- a column oven provided with an air intake port and an air outlet port;
- a stirring fan configured to stir air in the column oven;
- an opening-and-closing mechanism configured to open and close the air intake port and the air outlet port;
- a controller;
- a cooling fan configured to cool the controller; and
- a control chamber provided outside the column oven, the control chamber being communicated with an inside of the column oven via the air intake port in a state in which the air intake portion is opened by the opening-and-closing mechanism, the control chamber being provided therein with the controller; and
- a switching mechanism configured to switch a wind direction of the cooling fan in the state in which the air intake portion is opened by the opening-and-closing mechanism to direct at least a part of wind from the cooling fan to the air intake port.

According to the gas chromatograph device as recited in the above-described Item 1, at least a part of the wind from the cooling fan can be directed to the air intake port of the column oven by switching the wind direction of the cooling fan. Further, in the case of switching the wind direction of the cooling fan to direct only a part of the wind from the column oven to the controller, the remainder of the wind from the cooling fan can be directed to the controller. That is, it is possible to cool the controller while cooling the inside of the column oven efficiently. On the other hand, in the case of switching the wind direction of the cooling fan to direct all of the wind from the cooling fan to the air intake port of the column oven, the all of the wind from the cooling fan can be directed to the air intake port of the column oven. That is, it is possible to cool the inside of the column oven more efficiently.

(Item 2)

In the gas chromatograph device as recited in the above-described Item 1, it may be configured such that the switching mechanism includes a rectifying member that is displaceable, the rectifying member being configured to direct the at least a part of wind from the cooling fan to the air intake port in the state in which the air intake portion is opened by the opening-and-closing mechanism.

According to the gas chromatograph device as recited in the above-described Item 2, it is possible to direct at least a part of the wind from the cooling fan to the air intake port of the column oven by using the rectifying member.

(Item 3)

In the gas chromatograph device as recited in the above-described Item 2, it may be configured such that the opening-and-closing mechanism includes an opening-and-closing door configured to open and close the air intake port, and the switching mechanism is configured to switch the wind direction of the cooling fan by using the opening-and-closing door as the rectifying member.

According to the gas chromatograph device as recited in the above-described Item 3, it is possible to direct at least a part of the wind from the cooling fan to the air intake port of the column oven by using the opening-and-closing door for opening and closing the air intake port of the column oven. Further, the opening-and-closing door serves as a rectifying member, and therefore, there is no need to provide a rectifying member separately. Therefore, it is possible to suppress an increase in the number of components.

(Item 4)

In the gas chromatograph device as recited in the above-described Item 2 or 3, it may be configured such that the cooling fan is provided so as to face a direction inclined with respect to an air intake direction of the air intake port, and the rectifying member blocks the at least a part of wind from the cooling fan in the state in which the air intake port is opened by the opening-and-closing mechanism to direct the at least a part of wind to the air intake port.

According to the gas chromatograph device as recited in the above-described Item 4, it is possible to direct at least a part of the wind to the air intake port of the column oven by blocking at least a part of the wind from the cooling fan by using the rectifying member. Therefore, by adjusting the amount of air to be blocked by the rectifying member, the amount of air to be directed to the air intake port of the column oven can be adjusted.

(Item 5)

In the gas chromatograph device as recited in any one of the above-described Items 1 to 4, it may be configured such that the gas chromatograph device further includes a cooling processing unit configured to, when cooling the inside of the column oven, open the air intake port by the opening-and-closing mechanism and drive the stirring fan while directing at least a part of air from the cooling fan to the air intake port by the switching mechanism.

According to the gas chromatograph device of Item 5, when cooling the inside of the column oven, it is possible to drive the stirring fan while directing at least a part of the wind from the cooling fan to the air intake port of the column oven. Further, in the case of driving the stirring fan while directing only a part of the wind from the cooling fan to the air intake port of the column oven, it is possible to cool the inside of the column oven efficiently while cooling the controller. On the other hand, in the case of driving the stirring fan while directing all of the air from the cooling fan to the air inlet port, it is possible to cool the inside of the column fan more efficiently.

(Item 6)

In the gas chromatograph device as recited in the above-described Item 5, it may be configured such that the cooling processing unit is configured to, when cooling the inside of the column oven, increase a rotation speed of the cooling fan in accordance with the switching of the wind direction of the cooling fan by the switching mechanism.

According to the gas chromatograph device as recited in the above-described Item 6, it is possible to cool the inside of the column oven more efficiently as compared with the case in which the rotation speed of the cooling fan is not increased.

The invention claimed is:
1. A gas chromatograph device comprising:
a column oven provided with an air intake port, an air outlet port and a first internal space;
a stirring fan provided in the column oven, and configured to stir air in the column oven;
an opening-and-closing mechanism configured to open and close the air intake port and the air outlet port;
a control chamber provided outside the column oven, the control chamber having a second internal space being communicated with an inside of the column oven via the air intake port in a state in which the air intake port is opened by the opening-and-closing mechanism;
a controller provided in the control chamber, the controller performing one or more controls of the gas chromatograph device;
a cooling fan provided in the control chamber, the cooling fan having a rotational axis oriented so that a wind therefrom is directly or indirectly provided to the controller, the rotational axis being offset from a line connecting the cooling fan and the air intake port; and
a switching mechanism configured to switch a wind direction of the cooling fan to direct at least a part of wind from the cooling fan to the air intake port in the state in which the air intake port is opened by the opening-and-closing mechanism so that the first internal space of the column oven and the second internal space of the control chamber are communicated with each other.

2. The gas chromatograph device as recited in claim 1, wherein the switching mechanism includes a rectifying member that is displaceable, the rectifying member being configured to direct the at least a part of wind from the cooling fan to the air intake port in the state in which the air intake port is opened by the opening-and-closing mechanism.

3. The gas chromatograph device as recited in claim 2, wherein the opening-and-closing mechanism includes an opening-and-closing door configured to open and close the air intake port, and
wherein the switching mechanism is configured to switch the wind direction of the cooling fan by using the opening-and-closing door as the rectifying member.

4. The gas chromatograph device as recited in claim 2, wherein the cooling fan is provided so as to face a direction inclined with respect to an air intake direction of the air intake port, and
wherein the rectifying member blocks the at least a part of wind from the cooling fan in the state in which the air intake port is opened by the opening-and-closing mechanism to direct the at least a part of wind to the air intake port.

5. The gas chromatograph device as recited in claim 1, further comprising:
a cooling processing unit configured to, when cooling the inside of the column oven, open the air intake port by the opening-and-closing mechanism and drive the stirring fan while directing at least a part of air from the cooling fan to the air intake port by the switching mechanism.

6. The gas chromatograph device as recited in claim 5, wherein the cooling processing unit is configured to, when cooling the inside of the column oven, increase a rotation speed of the cooling fan in accordance with switching of the wind direction of the cooling fan by the switching mechanism.

* * * * *